US009083139B2

(12) United States Patent
Ertel et al.

(10) Patent No.: US 9,083,139 B2
(45) Date of Patent: Jul. 14, 2015

(54) MOUNTING VANE FOR OPTICAL ELEMENT OF A LASER

(71) Applicant: THE SCIENCE AND TECHNOLOGY FACILITIES COUNCIL, Chilton, Didcot, Oxfordshire (GB)

(72) Inventors: Klaus Ertel, Didcot (GB); Michael Fitton, Yarnton (GB); Tristan Davenne, Collingbourne Ducis (GB)

(73) Assignee: THE SCIENCE AND TECHNOLOGY FACILITIES COUNCIL, Chilton, Didcot, Oxfordshire (GB)

( * ) Notice: Subject to any disclaimer, the term of this patent is extended or adjusted under 35 U.S.C. 154(b) by 0 days.

(21) Appl. No.: 14/367,022

(22) PCT Filed: Dec. 21, 2012

(86) PCT No.: PCT/GB2012/053237
§ 371 (c)(1),
(2) Date: Jun. 19, 2014

(87) PCT Pub. No.: WO2013/093500
PCT Pub. Date: Jun. 27, 2013

(65) Prior Publication Data
US 2014/0328360 A1 Nov. 6, 2014

(30) Foreign Application Priority Data
Dec. 22, 2011 (GB) ................................ 1122172.8

(51) Int. Cl.
*H01S 3/04* (2006.01)
*F28F 13/08* (2006.01)
(Continued)

(52) U.S. Cl.
CPC ............... *H01S 3/0407* (2013.01); *F28F 3/00* (2013.01); *F28F 13/08* (2013.01); *H01S 3/025* (2013.01);
(Continued)

(58) Field of Classification Search
USPC ..................... 372/34–35, 51, 55–56
See application file for complete search history.

(56) References Cited

U.S. PATENT DOCUMENTS 4,578,792 A * 3/1986 Hoag .............................. 372/58
2005/0257912 A1 11/2005 Monty et al.
(Continued)

OTHER PUBLICATIONS

The Mercury Project: A High Average Power, Gas-Cooled Laser for Inertial Fusion Energy Development; Bayramian, et al.; Fusion Science and Technology; vol. 52; Oct. 2007; pp. 383-387.
Activation of the Mercury Laser: A Diode-Pumped Solid-State Laser Driver for Inertial Fusion; Bayramian et al.; U.S. Department of Energy; Lawrence Livermore National Laboratory; Mar. 7, 2001.
Optical Properties of Turbulent Channel Flow; G. F. Albrecht, H. F. Robey, A. C. Erlandson; Applied Optics; vol. 29, No. 21; Jul. 20, 1990; pp. 3079-3087.

(Continued)

*Primary Examiner* — Dung Nguyen
(74) *Attorney, Agent, or Firm* — Preti Flaherty Beliveau & Pachios LLP

(57) ABSTRACT

A mount for an optical element such as in a laser, optical amplifier, or other optical system, is disclosed. The mount is a mounting vane (100) for cooling the optical element (125) by a fluid stream. The optical element may be a gain medium generating heat. The mounting vane comprises: an input section with a leading edge (110) for meeting the fluid stream; a diffuser section (130) which tapers to a trailing edge (135); and a plane section (120) with an aperture for receiving the optical element (125) for cooling by the fluid stream, the plane section arranged between the input section and diffuser section, wherein the diffuser section (130) includes one or more flow guiding fins (140) protruding from the diffuser section. The mounting vane may be stacked with a plurality of other mounting vanes in a manifold. The shape of the vane plate results in a turbulent fluid flow improving the heat exchange between a laser disc heated by optical pumping and a cryogenic He gas used for cooling.

32 Claims, 16 Drawing Sheets

(51) Int. Cl.
  *H01S 3/02* (2006.01)
  *H01S 3/042* (2006.01)
  *F28F 3/00* (2006.01)
  *H01S 3/16* (2006.01)
  *H01S 3/23* (2006.01)
  *H01S 3/06* (2006.01)
  *F28D 15/00* (2006.01)
  *F28D 21/00* (2006.01)

(52) U.S. Cl.
  CPC .............. *H01S 3/042* (2013.01); *H01S 3/0404* (2013.01); *F28D 15/00* (2013.01); *F28D 2021/0029* (2013.01); *H01S 3/0604* (2013.01); *H01S 3/1618* (2013.01); *H01S 3/1643* (2013.01); *H01S 3/2316* (2013.01)

(56) References Cited

U.S. PATENT DOCUMENTS

2006/0250776 A1    11/2006  Abul-Haj et al.
2014/0008545 A1*   1/2014   Opuszynski .............. 250/396 R

OTHER PUBLICATIONS

Thermal Management in Inertial Fusion Energy Slab Amplifiers; Sutton et al.; U.S. Department of Energy; Lawrence Livermore National Laboratory; Jul. 17, 1995.
Thermal Management in Inertial Fusion Energy Slab Amplifiers; S. B. Sutton and G. F. Albrecht of the Lawrence Livermore National Laboratory; SPIE vol. 2633; pp. 272-281 (1997).
FY96-98 Summary Report Mercury: Next Generation Laser for High Energy Density Physics SI-014; Bayramian et al.; U.S. Department of Energy; Lawrence Livermore National Laboratory; May 23, 2000.
Bibeau et al., "The Mercury laser: a diode-pumped, gas-cooled Yb:S-FAP solid-state laser," May 7, 2000, XP002280138, Monday Morning / CLEO 2000, pp. 49-50.
Wang, J.R. et al., "Forced convective cooling of a high-power solid-state laser slab," Applied Thermal Engineering, Oxford, GB, vol. 26, No. 5-6, Apr. 1, 2006, pp. 549-558.
Bibeau, C., "The Mercury Laser Project," 2002 High Average Power Laser Review, San Diego, California, Apr. 4 & 5, 2002.

* cited by examiner (a)

(b)

MOUNTING VANE FOR OPTICAL ELEMENT OF A LASER

TECHNICAL FIELD

The present invention relates to a mount for an optical element such as in a laser, optical amplifier, and other types of optical systems. In embodiments the mount is configured for cooling of the optical element in a gas or liquid stream. The optical element may be an element that becomes heated in operation such as an optical gain medium. The present invention also provides an optical assembly comprising a plurality of vane mounted optical elements.

BACKGROUND ART

Lasers with a high output power are required for a number of applications, such as materials processing, particle acceleration, military applications, and laser induced fusion for energy production. Lasers for these applications are required to provide high energy, high repetition rate pulses. One of the challenges associated with obtaining stable and reliable pulse generation is managing the heat generated in optical elements of the laser. Heating may occur in a variety of components such as optical gain media, Pockels cells, Faraday isolators, frequency conversion stages where some optical absorption occurs and many other components in which absorbed energy is converted to heat. Conventional lasers producing high-energy pulses use rods with water cooling or slabs without active cooling as a gain medium. The pulse energy and/or the pulse repetition rate provided by such lasers is not high enough for laser induced fusion and other applications, such as laser-driven particle accelerators.

Thermal management in optical gain media arranged as slabs has been investigated under a US Department of Energy contract, the results of which have been published as "Thermal Management in Inertial Fusion Energy Slab Amplifiers", Sutton and Albrecht, Lawrence Livermore National Laboratory, 1$^{st}$ International Conference on Lasers for Inertial Confinement Fusion, Monterey, Canada, May 30-Jun. 2 1995 and as Sutton, S. B. & Albrecht, G. F. (1995), "Thermal management in inertial fusion energy slab amplifiers", Proceedings of SPIE 2633, 272-281. These papers describe the use of gas-cooling of large aperture slabs where the beam propagates through the cooling medium. The consequences of poor thermal management are thermally induced aberrations and thermally induced birefringence, both leading to a degradation of the quality of the transmitted beam. Thermally induced deformation or expansion of the gain material can cause beam steering. In the extreme case, the thermally induced stresses can lead to cracking of the gain medium. The arrangement described by Sutton and Albrecht uses an end-pumped configuration with the slabs of gain medium oriented normal to the pump laser beam. The pump laser beam was provided from semiconductor laser diodes. The end-pumped arrangement used gain media segmented into a series of thin slabs with cooling channels therebetween. A gas is pumped at high velocity through the channels to remove heat from the slabs. As mentioned above, the pump laser beam and emitted beam pass through the cooling medium. Turbulent flow and spatial variations in the cooling rate were previously considered to be major barriers to achieving good beam quality. Turbulent flow was considered to introduce non-uniform scattering losses, whereas spatial variation in cooling rate was considered likely to result in unacceptably large variations in optical path length in the system. The paper describes that the use of helium as a cooling medium can overcome these problems.

A later project, known as the Mercury Laser, is described in "Activation of the Mercury Laser: A diode-pumped solid-state laser driver for inertial fusion", Bayramian et al., Advanced Solid-State Lasers 2001 Topical Meeting and Tabletop Exhibit, Seattle, Wash., Jan. 29-31, 2001. The project is also described in A. Bayramian et al. (2007), "The mercury project: A high average power, gas-cooled laser for inertial fusion energy development", Fusion Science and Technology 52(3), 383-387. The project goal was to design a laser capable of producing 100J pulses having a pulse length of 2-10 ns and a repetition rate of 10 Hz. FIG. 1 is a schematic diagram showing the system for cooling the slabs of gain medium. The cooling system 5 comprises a heat exchanger 10, channels for routing the gas stream 30, a circulating fan 20, and laser amplifier 50 which includes vane mounts 60. The heat exchanger 10 cools the gas after it has passed by the gain media. The circulating fan 20 pumps the gas around the system towards the laser amplifier. The laser amplifier 20 includes slabs of gain medium 62 mounted in aerodynamic vanes 60. FIG. 2 shows the vanes 60 mounted in the amplifier. The vanes 60 are stacked such that the slabs of gain material lie adjacent to each other and coincident with windows 82 in the amplifier manifold. Around the edge of each slab is edge cladding 84 to locate and support the slabs in the vanes.

Small gaps 86 between the vanes, and between the vanes and the manifold, provide channels through which the cooling gas flows. Gas is pumped through the amplifier manifold. The gas first approaches the nozzle section 70 which conditions the gas stream by narrowing the cross section within the manifold to match the stack of vanes. The gas next passes through straight section 80 which has channels or gaps between the vanes 60, cooling the slabs. After the channel section 80 the vanes narrow in the diffuser section 90 and the gas merges back together.

The optical gain medium is pumped by a beam arranged normal to the plane of the slabs. The output beam generated is also normal to the slabs. The narrow channels between the vanes and the curved leading edge accelerate the gas to produce turbulent flow between the slabs. Turbulent flow provides better cooling than laminar flow. The diffuser section 90 decelerates the gas and the flows merge back together at the trailing edge of the vanes. The diffuser section 90 tapers in a series of steps. The pressure drop across the channels was found to be small enough to prevent the formation of wake disturbances. The measured wavefront output from the amplifier includes a wavefront distortion due to heating of the gas as it traverses the amplifier. The gas used in the cooling system was helium at a gas pressure of 4 bar within the channels of the straight section. The gas velocity within the channels is Mach 0.1 and the mass flow rate is ~1 g/sec. The gas operates at around room temperature.

Operating the cooling system at lower temperatures and higher pressures than those used in Mercury brings about certain benefits.

SUMMARY OF THE INVENTION

The present invention provides a mounting vane for an optical element of a laser, optical amplifier or other optical system, the mounting vane for cooling by a fluid stream, the mounting vane comprising: an input section with a leading edge for meeting the fluid stream, that is the leading edge is the first part of the mounting vane to be subjected to the fluid stream; a diffuser section which tapers to a trailing edge, the trailing edge being the last part of the mounting vane to be subjected to the fluid stream; and a plane section with an aperture for receiving the optical element for cooling by the fluid stream, the plane section arranged between the input section and diffuser section, wherein the diffuser section includes one or more flow guiding fins protruding from the diffuser section. The flow guiding fins are preferably straight to keep the fluid stream flowing straight after passing over the diffuser section. The fins reduce flow recirculation downstream of the diffuser. Reduced flow recirculation reduces the occurrence of flow instabilities and thereby reduces vibration from induced by unstable flow.

The fluid is preferably a gas, but may be a liquid.

The fins may have a length equal to the length of the diffuser section. The fins may be parallel. A plurality of fins may be distributed across the vane in a direction transverse to the flow direction of the stream.

The plurality of fins are preferably equally spaced across the vane.

The optical element may be a heat generating element, such as optical gain medium. The optical gain medium may comprise Yb:YAG, Nd:YAG, or other solid state laser material that lends itself to optical pumping.

The aperture for receiving the optical element may be rectangular or square and a diagonal of the rectangle or square may be arranged parallel to the direction of the stream. The diagonal arrangement prevents one edge of the square or rectangle from becoming significantly hotter than the others.

Alternatively the aperture for receiving the optical element may be circular or elliptical.

The leading edge may have a curved cross-section such that when the vane is mounted in the stream the stream flow is accelerated. By accelerating the flow into a small gap between adjacent vanes, the flow between vanes is turbulent. This provides better cooling than laminar flow. The cross-sectional curve may be elliptical and may be elliptical along substantially all or part of its length. The curved cross-section may be continuously curved around the leading edge, for example such that the surfaces of the vane are linked by a continuous curve.

The taper of the diffuser section may include surfaces which elliptically curve to zero thickness.

The present invention also provides an optical assembly comprising: a plurality of the mounting vanes as set out above; a manifold having an input and an output for the fluid stream to flow through and a pair of windows for transmitting an incident light beam to the optical elements, wherein the mounting vanes are stacked in the manifold and the optical element of each mounting vane aligns with the windows of the manifold.

The mounting vanes are preferably stacked such that the one or more fins of a first mounting vane are aligned with the one or more fins of a second mounting vane so that the fins divide the stream transversely to the plane of the mounting vane and form a plurality of channels for the stream to flow through. The fins of one mounting vane may abut, or meet end on, the fins of another vane.

The channels may be substantially rectangular and formed by the mounting vanes and aligned fins.

The optical assembly may further comprise an input flow conditioner internally shaped to convert a fluid stream of circular cross-section to a fluid stream of rectangular cross-section, and/or an output flow conditioner internally shaped to convert a gas stream of rectangular cross-section to a gas stream of circular cross-section. The internal shaping may comprise a surface that tapers from a circular cross-section to a rectangular cross-section. For example, the curvature of parts of the circular surface may increase to form the corners of the rectangle.

The mounting vanes are preferably spaced in the stack such that the fluid stream flows turbulently through the space between the mounting vanes.

The present invention provides a laser comprising the mounting vane set out above or the optical assembly set out above and wherein the optical element is an optical gain medium.

The present invention provides an optical amplifier comprising the mounting vane set out above or the optical assembly set out above and wherein the optical element is an optical gain medium.

The laser or optical amplifier is preferably arranged such that a pump beam is incident on the optical gain medium. The pump beam and/or output beam may propagate through the cooling fluid stream.

The present invention provides an optical assembly comprising one or more mounting vanes and a manifold, each mounting vane for mounting an optical element of a laser or optical amplifier for cooling by a fluid stream, each mounting vane comprising: an input section with a leading edge for meeting the fluid stream; a diffuser section which tapers to a trailing edge; and a plane section with an aperture for receiving the optical element for cooling by the fluid stream, the plane section arranged between the input section and diffuser section, and the manifold having an input and an output for the fluid stream to flow through and a pair of windows for transmitting an incident light beam to the optical element, the one or more mounting vanes for mounting in the manifold such that the optical element of each mounting vane aligns with the windows of the manifold, wherein the manifold comprises one or more flow guiding fins protruding towards the diffuser section of the mounting vane.

The present invention further provides a mounting vane for an optical element of a laser or optical amplifier, the mounting vane for cooling by a fluid stream, the mounting vane comprising: an input section with a leading edge for meeting the fluid stream; a diffuser section which tapers to a trailing edge; and a plane section with an aperture for receiving the optical element for cooling by the fluid stream, the plane section arranged between the input section and diffuser section, wherein the input section has an elliptically curved cross-section such that when the vane is mounted in the stream the stream flow is accelerated.

The present invention further provides a mounting vane for an optical element of a laser or optical amplifier, the mounting vane for cooling by a fluid stream, the mounting vane comprising: an input section with a leading edge for meeting the fluid stream; a diffuser section which tapers to a trailing edge; and a plane section with an aperture for receiving the optical element for cooling by the fluid stream, the plane section arranged between the input section and diffuser section, wherein the diffuser section has an elliptically curved cross-section such that when the vane is mounted in the stream the stream flow is decelerated.

BRIEF DESCRIPTION OF THE DRAWINGS

Embodiments of the present invention, along with aspects of the prior art, will now be described with reference to the accompanying drawings, of which.

DETAILED DESCRIPTION

Figure 3:
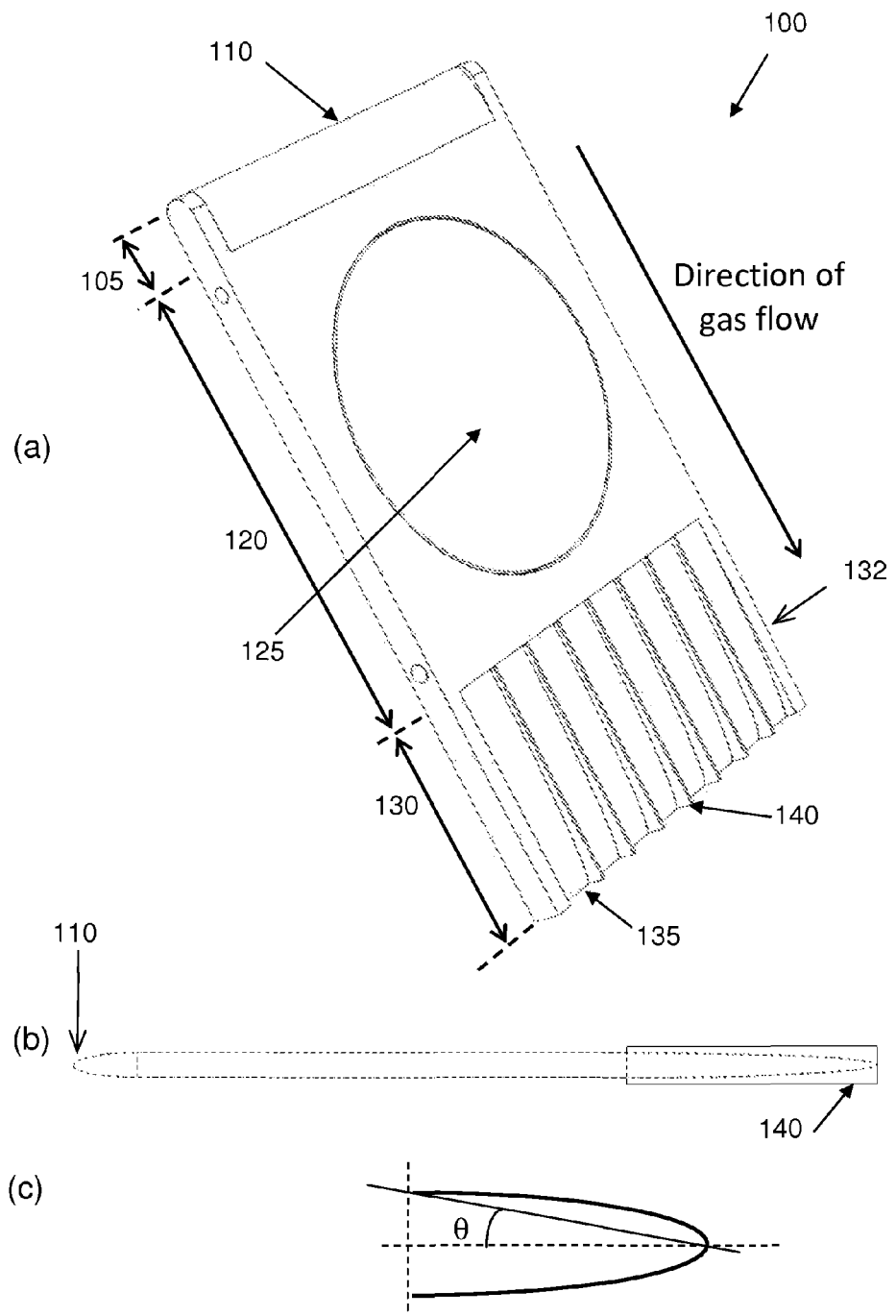
FIG. 3a shows in perspective view the detail of a mounting vane according to the present invention.
FIG. 3b shows a cross-section through the vane when viewed form the side.
FIG. 3c illustrates the angle of the trailing edge of the vane.

FIG. 3 shows the mounting vane 100 according to the present invention. FIG. 3a shows a perspective view of the mounting vane. FIG. 3b is a side view of the mounting vane.

The mounting vane 100 includes an input section 105 which when mounted in an amplifier manifold receives the cooling gas first. The middle part of the vane is where the optical element 125 or slab is mounted and is a straight section 120. The last part of the vane 100 to receive the cooling gas is the diffuser section 130.

The input section comprises a leading edge 110 with an elliptical cross-section as shown in FIG. 3b. The shape is designed to minimize pressure drop in the system by a gently decreasing curvature (increasing radius of curvature). The elliptical cross-section is preferably defined by an ellipse having a ratio of major:minor axes of 4:1. For a vane having a straight section 120 thickness of 5 mm, the minor axis has a length of 2.5 mm and the major axis has a length of 10 mm. Other sizes of ellipse may be used. The input section 105 may take other elliptical shapes and shapes other than an ellipse.

Figure 12:
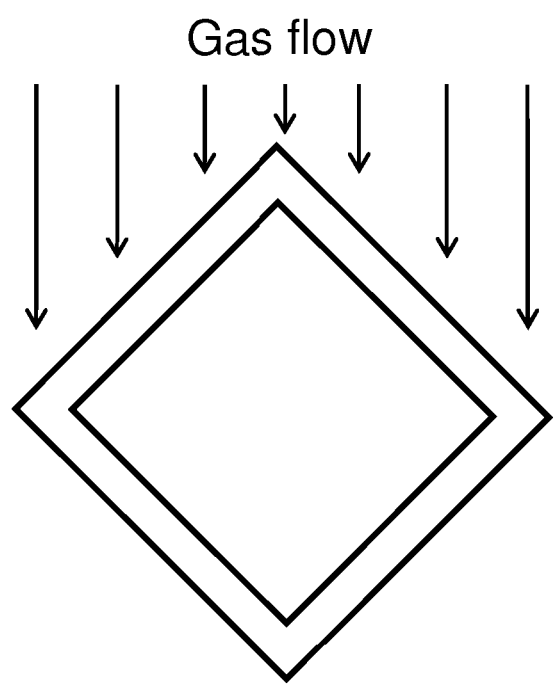
FIG. 12 shows a square-shaped slab of gain medium oriented diagonal to the coolant flow direction.

The straight channel section 120 is sized to be large enough to hold the optical element 125, which may be an optical gain medium, Pockels cell, Faraday isolator, frequency conversion stage where there is some optical absorption and heat is generated, and other optical devices such as those which may generate heat. As shown in FIG. 3a the optical element 125 may be circular and is therefore mounted in a circular aperture in the vane. Alternatively, the optical element may be other shapes such as square or rectangular. Rectangular is commonly the case for high power lasers where the pump source comprises a plurality of diode lasers arranged in one or more arrays. In such cases the optical slabs tend to have a large aperture to avoid the risk of optical damage due to excessive optical energy density. For a square or rectangular optical element the aperture in the vane 100 should be arranged such that the diagonal of the rectangle or square is parallel to the direction of flow of the cooling gas, as shown in FIG. 12. By arranging the optical element on the diagonal compared to parallel to the gas flow direction avoids the corners and edge from becoming hotter than the rest of the optical element. If arranged parallel the edge that is subjected to the cooling gas last may get hot.

Between the edge of the optical element and the vane may be a cladding to support the optical element. For square optical elements with an absorptive edge cladding the diagonal alignment of the element provides improved heat removal from the cladding compared to an arrangement in which the element is arranged with sides parallel to the flow direction. This diagonal orientation minimises temperature gradient across the disc.

The diffuser section 130 comprises a single long tapered section with a shallow angle and elliptical cross-section. The cross-section may be shaped such that the upper and lower surfaces are part of an ellipse which meet at a tip so as not to form a rounded edge but a wedge or vertex tip. If an ellipse is used to form the upper and lower surface with a rounded trailing edge, the ellipse has a much greater major axis than the minor axis. For example, the major axis may be ten to twenty times the minor axis. For a vane having a straight section 120 thickness of 5 mm, the major axis was 35 mm and the minor axis 2.5 mm. Other sizes of ellipse may be used. The trailing edge 135 may also take other elliptical shapes and shapes other than an ellipse. FIG. 3c shows an effective taper angle $\theta$ produced by the diffuser calculated from the ratio of its thickness to length. The length of the diffuser section may be such as to provide an average taper angle of up to 10 degrees. In an example, embodiment for a vane of 5 mm thickness, a taper length of 40 mm has been used which provides a taper angle $\theta$ of 3.6 degrees. The long taper section and shallow taper angle reduce the possibility of stalls occurring as the cooling gas flows over the vane and provide stable flow conditions.

Fins 140 are provided to keep the gas flow in a straight line as the gas slows down over the diffuser section 130. The fins 140 are ridges having a height similar to the thickness of the straight section 120 and stand normal to the diffuser surface. The fins extend in the direction of the gas flow and preferably extend from the start of the diffuser section to the end of it. In some embodiments, the fins may extend for only part of the length of the diffuser section or for longer than the diffuser section. Preferably, a plurality of fins are provided. The fins may be distributed across the diffuser at equal spacings apart. The actual number of fins required will be determined by characteristics of the flow. However, in one embodiment there are seven fins 140 distributed across a 64 mm wide and 40 mm long diffuser section. The fins 140 should be as thin as possible so as not to cause a significant additional obstruction to the gas and thereby cause an increased pressure drop. The minimum thickness is determined by manufacturing and materials constraints. The fins prevent flow recirculation and transient wake flow from occurring after the gas has passed the diffuser. Some results of pressure drop and flow lines are described in the Example Embodiment section below.

Figure 4:
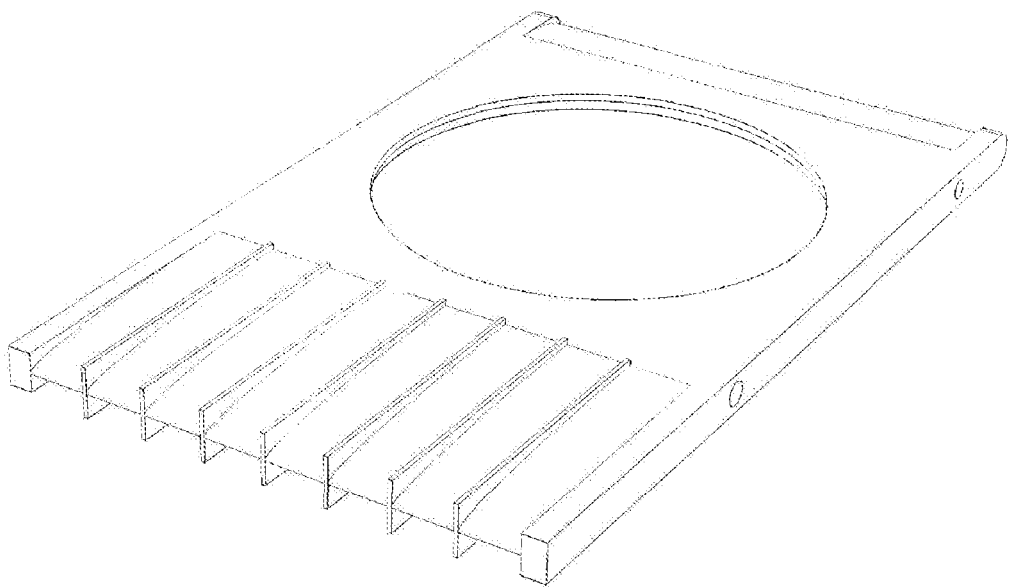
FIG. 4 is a perspective view of the mounting vane including the diffuser section.

FIG. 4 is a further view of the mounting vane. The detail of the diffuser section 130 and fins 140 is shown. The narrow width of the fins and taper of the diffuser are clearly shown.

Figure 5:
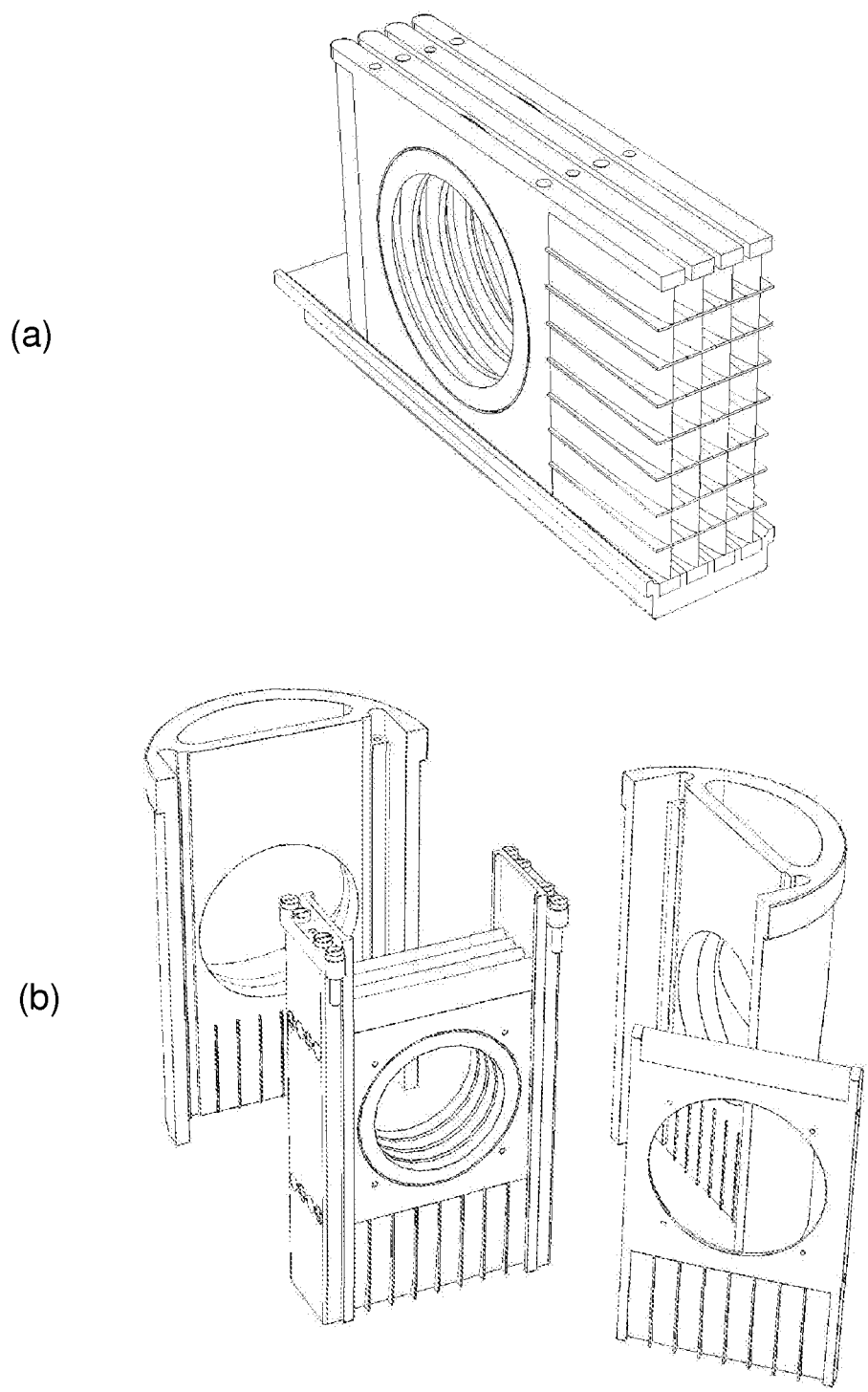
FIG. 5a is a perspective view of four vanes stacked together.
FIG. 5b shows the components making up the manifold assembly.

The vane mounts are fitted in a rack for holding a plurality of the vane mounts in a stack. FIG. 5a shows four mounting vanes arranged in a rack. The rack consists of two side parts, one of which is shown in FIG. 5a below the mounting vanes. FIG. 5b shows three mounting vanes arranged in a rack. The mounting vanes are fitted between both side parts of the rack. FIG. 5b also shows three other components, which include a further mounting vane and two semicircular pipe components which when assembled together form a manifold.

Figure 6:
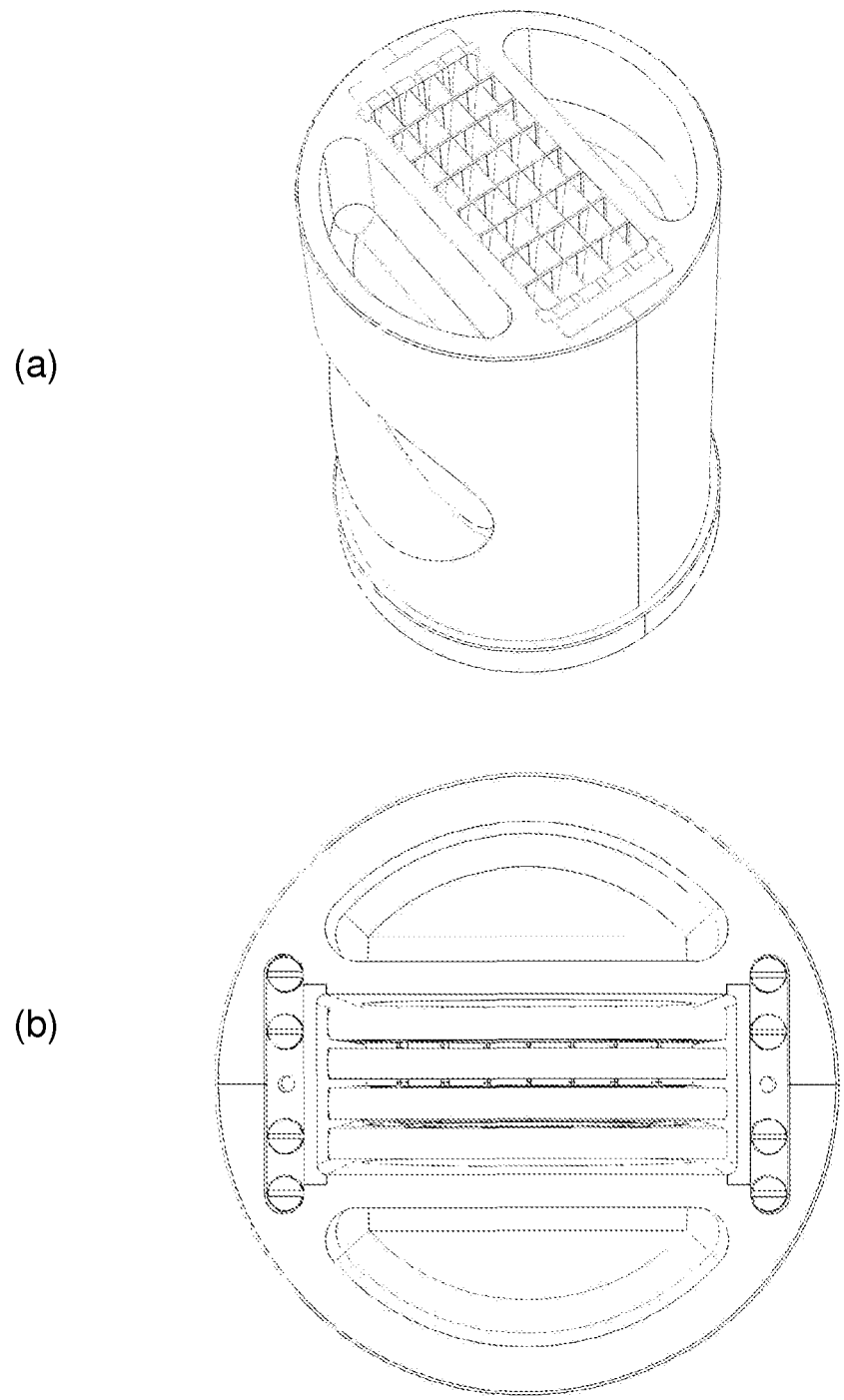
FIGS. 6a and 6b are view of an assembled manifold.

FIGS. 6a and 6b show four mounting vanes in the assembled manifold. FIG. 6a shows the manifold exit with diffuser section 130 and fins 140 of the vane. FIG. 6b shows the entrance to the manifold and the leading edges 110 of the four mounting vanes. As shown in FIG. 6a the spacing and position of the fins on each of the four diffusers is identical such that the fins of the diffusers are aligned to form an array of rectangular channels. The diffuser section of the mounting vanes has an edge rib (132 in FIG. 3a) which is the same thickness as the straight section and input sections of the vane. This is best shown at the top of FIG. 5a. The straight sections 120 of the vanes are spaced apart a small amount in the rack, but because the fins extend beyond the surface of the straight section 120, the fins meet to form a plurality of channels. In some embodiments the fins do not meet and are spaced apart by a small amount but the rectangular channels are nevertheless formed all be it with a small section joining adjacent channels together.

In an alternative arrangement the fins may form part of the manifold instead of being part of the mounting vanes. Nevertheless, the mounting vanes fit into the fins to provide substantially the same arrangement as shown in FIG. 6a. The fins cross the flow aperture, again preferably at equal spacing and divide the flow aperture into smaller channels as described above. The fins may include slots or grooves to receive and support the diffuser section of the mounting vanes, or the mounting vanes may include slots into which the fins locate.

Figure 7:
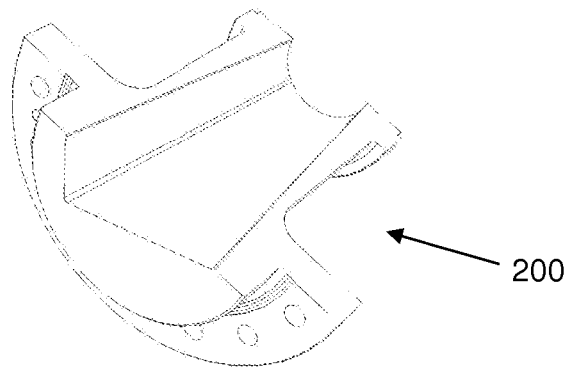
FIG. 7 is cut-away view of a flow conditioner.

In the cooling system, the manifold is mounted with flow conditioners to convert the gas stream from having a circular cross-section to having a rectangular cross-section and vice versa. A cut-away view of a flow converter 200 is shown in FIG. 7. The flow conditioner 200 is a short section of pipe in which the cross-section of the flow space is circular at one end and rectangular at the other. The contour of the internal flow space gradually changes from one shape to the other along the length of the pipe. The flow conditioner is manufactured by wire erosion. Conventional piping used in cooling systems have a circular internal flow cross-section. Although it is possible to connect a circular pipe directly to the manifold having a square internal cross-section such an arrangement is likely to result in flow instabilities. Hence, the flow conditioner 200 is required at the entrance and exit to the manifold. At the entrance to the manifold the flow conditioner converts a circular gas stream to a rectangular one for input to the stack of vanes. At the exit to the manifold the flow conditioner converts a rectangular gas stream to a circular one for input to the rest of the cooling system.

Figure 8A:
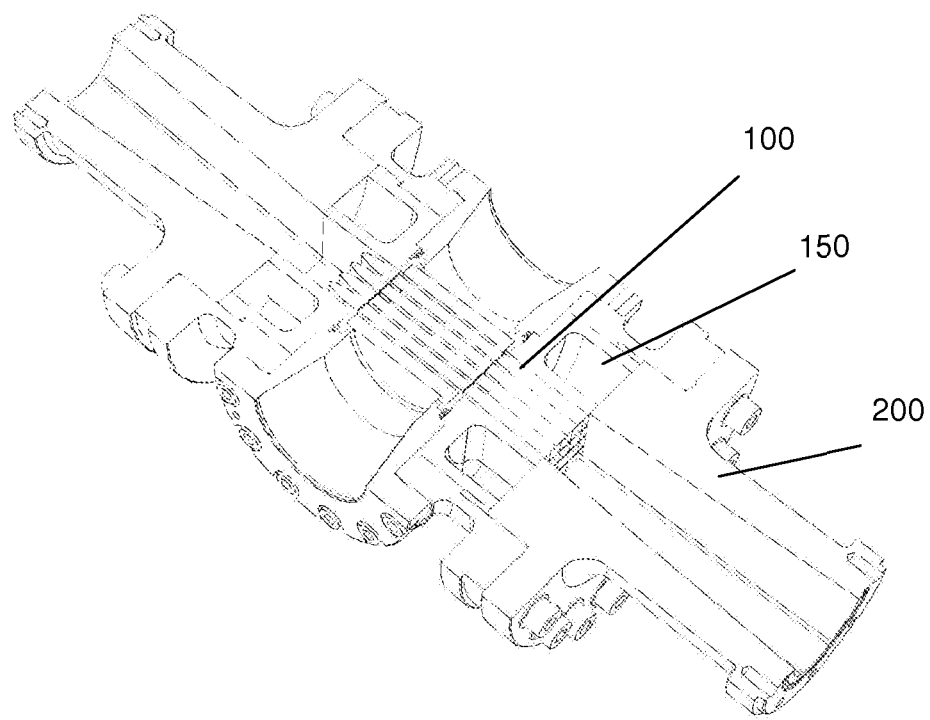
FIG. 8a is a cut-away view of an assembly.
Figure 8B:
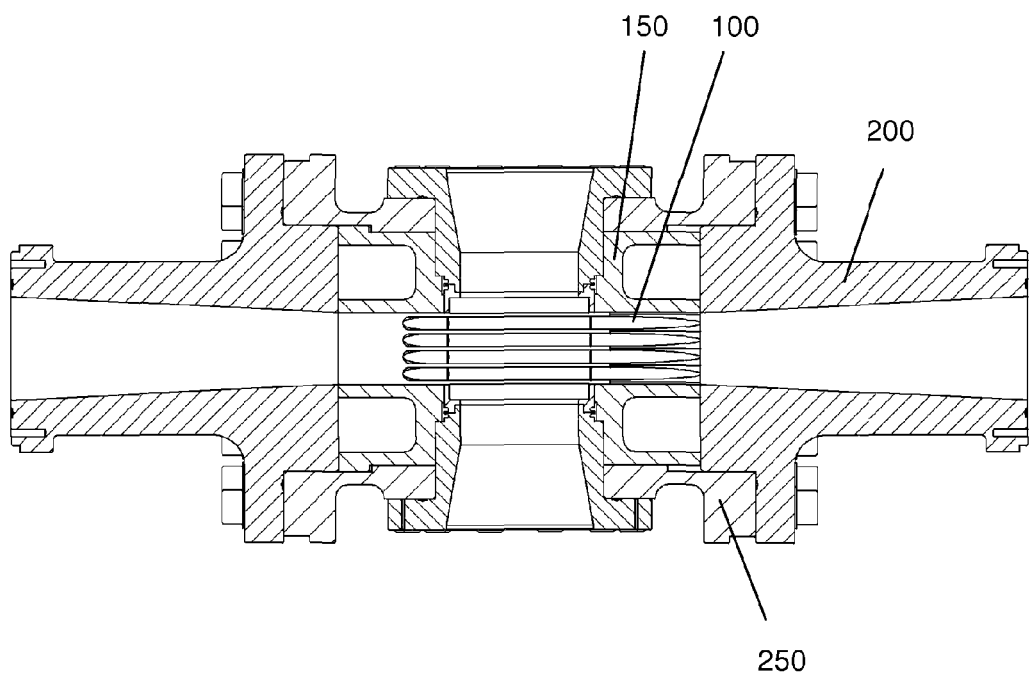
FIG. 8b is an isometric cross-sectional view through the assembly.

FIGS. 8a and 8b show the amplifier assembly in cross-section. The assembly is as fitted to the cooling section shown schematically in FIG. 9. The assembly comprises four vane mounts 100 which are seen in this figure in cross-section transverse to their plane. The mounting vanes 100 are stacked and arranged between the two semicircular parts 150 shown in FIGS. 5b and 6 and which form the manifold. Flow conditioners 200 are connected to the manifold by intermediate mounting rings 250.

Figure 1:
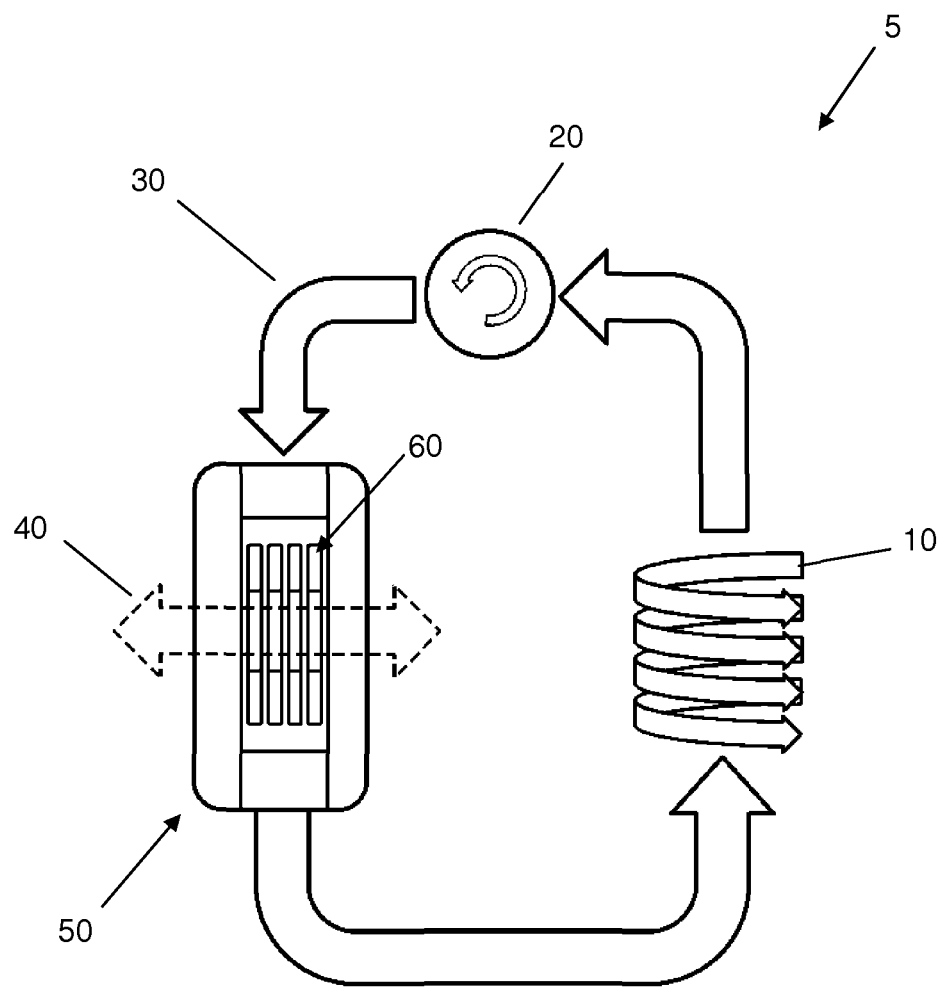
FIG. 1 is a schematic diagram of the cooling system of the prior art for cooling optical elements.
Figure 2:
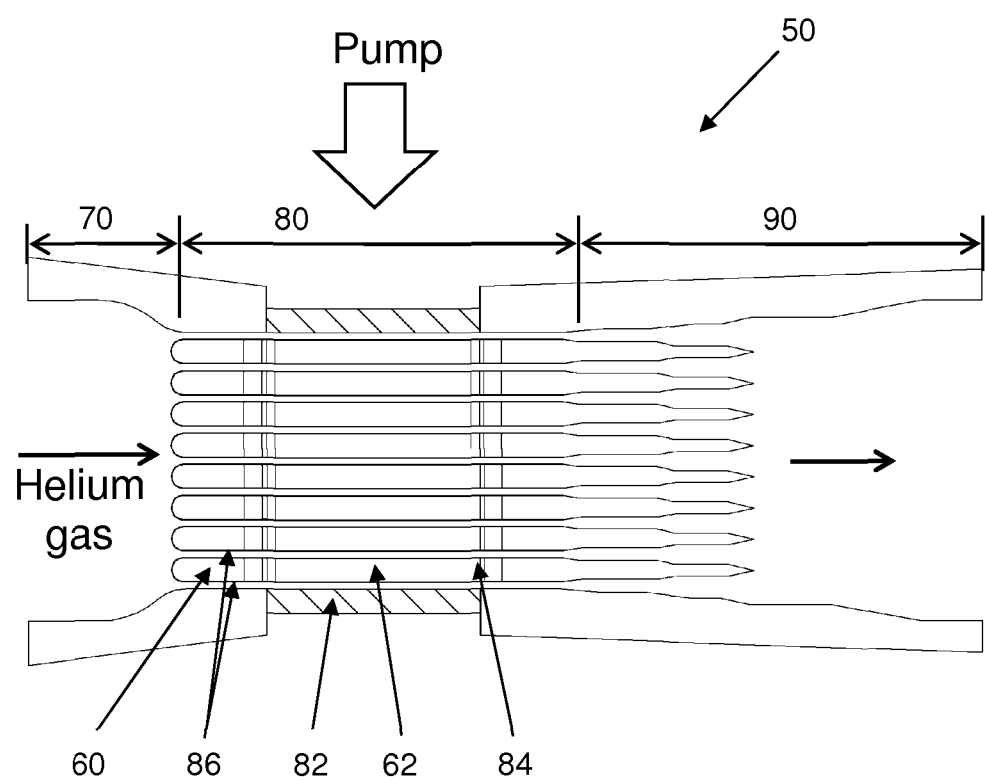
FIG. 2 is an illustration of a cross section through the gas cooled amplifier according to the prior art.
Figure 9:
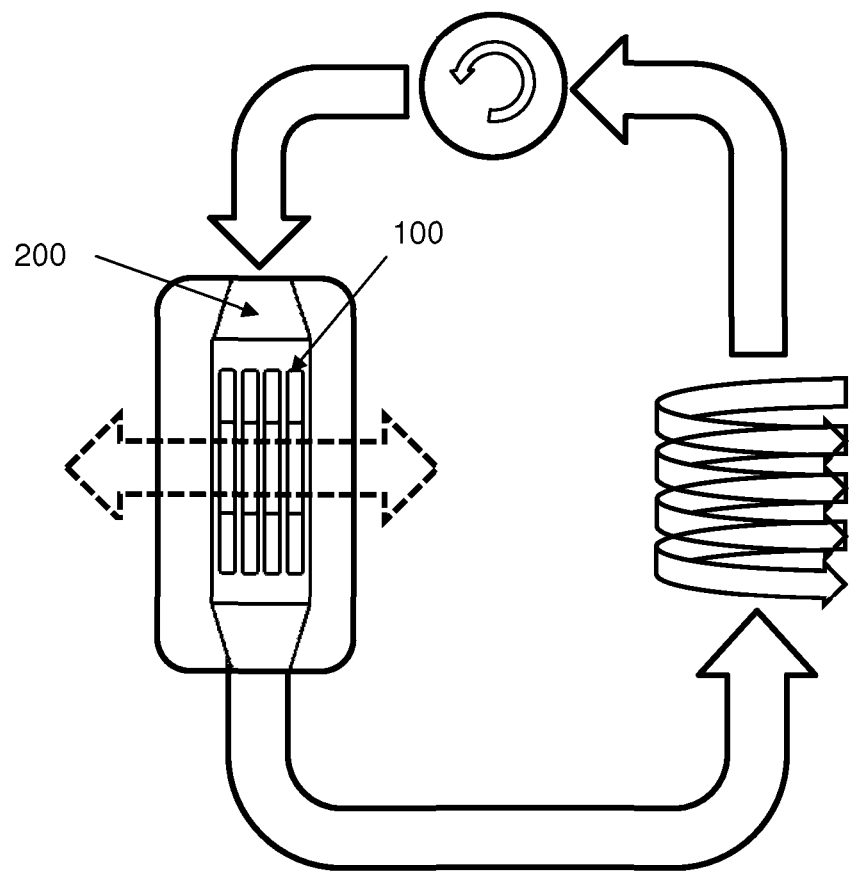
FIG. 9 is a schematic diagram of the cooling system of the present invention.

FIG. 9 is a diagram showing the cooling system, which is similar to that of FIG. 1 but includes the vane mounts 100 according to the present invention and assembled in the manner described above with flow conditioners 200 into an amplifier assembly. The heat exchanger is a cryogenic heat exchanger.

The cooling system has a temperature of operation from cryogenic temperatures, namely near liquid nitrogen temperatures (77K), up to just beyond room temperature (320K). The cooling system uses helium as the cooling gas because it is close to an ideal gas and is so over the whole temperature range. Helium also exhibits a high thermal conductivity, has a low boiling point which is below that of liquid nitrogen, and also minimises optical scatter from the turbulent gas flow. The latter has been described in the "Thermal Management in Inertial Fusion Energy Slab Amplifiers" paper by Sutton and Albrecht mentioned above. Helium has a factor of 600 lower scattering loss induced by turbulent flow than nitrogen. This is described by the lower Gladstone-Dale coefficient (GDC) for helium as compared to nitrogen (7.4 times greater). GDC is a constant of proportionality relating changes in refractive index to changes in relative gas density which are present with hot turbulent flow. The refractive index changes result in scattering.

Although embodiments describe the use of a gas as the coolant, it is also possible to use a liquid as the coolant. If a liquid is used the liquid must be optically inert since the pump beam and output beam travel through the coolant. A liquid will have a higher mass flow rate than a gas and so the flow velocity to achieve turbulent conditions will be much lower.

System Performance

The vane mount and cooling system aims to provide a stable mount for an optical element such as optical gain material while also cooling the gain material. The optical element is gas cooled. For gain material the pump and output beams pass through the cooling gas.

The laser for which the cooling system and vane mount is provided is capable of generating pulses with a repetition rate of <1 kHz while receiving pump powers amounting to 400 W. Of this around 100 W is output as optical energy and the remainder may be converted to heat. As mentioned above, to cool the laser the system is designed to operate from liquid nitrogen temperatures up to just above room temperature. This range can be approximated as 77K to 320K. Over this range of operation the optical material must experience little distortion and so prevent wavefront distortion. A temperature gradient across the optical element will introduce such distortions or aberrations in the beam passing through it. The strength of the distortions and aberrations will vary depending on the strength of the thermo-optic coefficients of the material. The mounting vane and cooling system provide a temperature gradient dT<10K across the surface of the optical element to minimise aberrations such as may cause wavefront tilt or defocus etc.

Obstacles in a flow stream will generally create a pressure drop. In the cooling system the mounting vanes will tend to create a pressure drop. The amount of pressure drop should be minimised. A lower pressure drop allows the cooling system to run at a higher mass flow rate for a given size of pump or fan thereby providing more effective cooling. High levels of pressure drop will reduce the cooling effectiveness. An acceptable level of pressure drop (dP) in the cooling system is defined by the capability of the cryogenic circulating fan, determined by flow rate and operating pressure. In the present invention the level of dP was 5000 Pa (50 mBar). Larger or more powerful circulating fans or pumps are able to overcome greater pressure drops but these have increased size as well as a higher purchase cost. The power required to drive them is also greater, which in itself produces additional heating which needs to be removed by the cooling system. At cryogenic temperatures the extra energy input required for the additional cooling is especially costly.

The mounting vanes and their spacing in the stack provide turbulent flow over the optical element. If the system is set up for laminar flow, the gas which starts flowing through the channels and is in close proximity to the optical element will remain close to them throughout its passage through the channel. Therefore, for laminar flow the gas will get hot because it remains close to the optical element. Turbulent flow is desirable since the gas close to the surface of the optical element will be continually changing and therefore turbulent flow provides a much greater heat transfer coefficient at the optical element. Thus, turbulent flow provides more effective heat transfer from the optical element to the cooling gas than laminar flow.

Stable flow is necessary to prevent vibration in the system. Any vibration could cause the optical element to vibrate and cause wavefront distortion. More serious vibration could also lead to adverse mechanical effects such as bolts holding the system together becoming loose or material fatigue.

As mentioned above, in an exemplary embodiment the optical element may be a gain medium. The average operating temperature of the optical element can be calculated from the coolant gas temperature and the heat transfer coefficient (HTC) of the surrounding flow.

The heat transfer coefficient (HTC) is calculated from the Reynolds number (Re) of the coolant flow, and depends on the velocity of the fluid and the hydraulic diameter of the channels between the mounting vanes. The Reynolds number also depends on the local properties of the fluid, namely the actual pressure and temperature in the proximity of the mounting vane. To achieve turbulent flow the Reynolds number should be greater than 5000.

The temperature range within the optical element is determined from its thermal conductivity, thickness, and the coolant mass flow rate. The coolant mass flow rate affects the temperature gradient dT across the disc due to the coolant heating up as it passes over the element. The higher the mass flow rate the lower the temperature gradient dT across the element in the direction of coolant flow.

The length of the diffuser section 130 should be a minimum of the length required to prevent transient stalls and therefore vibration instabilities from occurring. The length required for a straight edge diffuser can be estimated from textbooks such as "Applied Fluid Dynamics Handbook" by Blevins. The elliptical geometry for the diffuser shown in FIG. 3 achieves better performance than the straight edge described by Blevins. Other curved shapes are also possible to achieve good performance.

As mentioned above, the fins for flow straightening should be as thin as possible. The actual thickness is limited by machining and also by what can maintain a rigid fin. The fin should extend for the length of the diffuser section. Fins from neighbouring mounting vanes touch to form a plurality of channels.

A further advantage of including the flow straightening fins is that as well as preventing the wake disturbances, the fins allow greater range of design freedom for operation over a broader range of pressure drops. As mentioned above, lower pressure drops are beneficial for the operation of the cooling system because greater mass flow can be achieved for a given fan or pump power. This leads to improvements in cooling efficiency which is especially important for circulating fans or pumps operating at cryogenic temperatures.

The size of the gap between adjacent vanes which is required to achieve turbulent flow while meeting requirements regarding pressure drop and flow recirculation are dependent on a large number of factors such as mass flow rate, coolant temperature, Reynolds number and dimensional characteristics.

To reduce thermal stresses the materials used for the mounting vane should have a similar thermal expansion coefficient as that of the optical element. For the example, when the optical element is gain medium such as Yb:YAG, titanium may be used for the vane. Titanium has a thermal expansion coefficient of $8.6 \times 10^{-6}$ K$^{-1}$ which is close to that of a Yb:YAG crystal which has a thermal expansion coefficient of around $7.8 \times 10^{-6}$ K$^{-1}$. By matching the thermal expansion coefficients stress induced in the optical disc can be reduced. In extreme cases this prevents cracking, but more commonly reduces the effects of the thermo-optic and stress-induced effects which would cause changes in refractive index and produce scattering, wavefront distortion, or depolarisation.

Example Embodiment

FIG. 10 shows simulation results for a mounting vane according to the arrangement shown in FIGS. 3 and 4. The mounting vane is arranged to hold discs of ceramic Yb:YAG of diameter 55 mm and thickness 5 mm. The coolant is cryogenically cooled helium gas. The vane is 5 mm thick with elliptical leading edge and diffuser section as described above. Seven fins are distributed across a width of 64 mm and run the full length of the 40 mm long diffuser section. Other sizes and shapes are possible to produce stable flow, but the simulation results for this configuration are shown in FIG. 10. Typical mass flow rates are 30 g/second at 10 bar helium pressure.

Figure 10A:
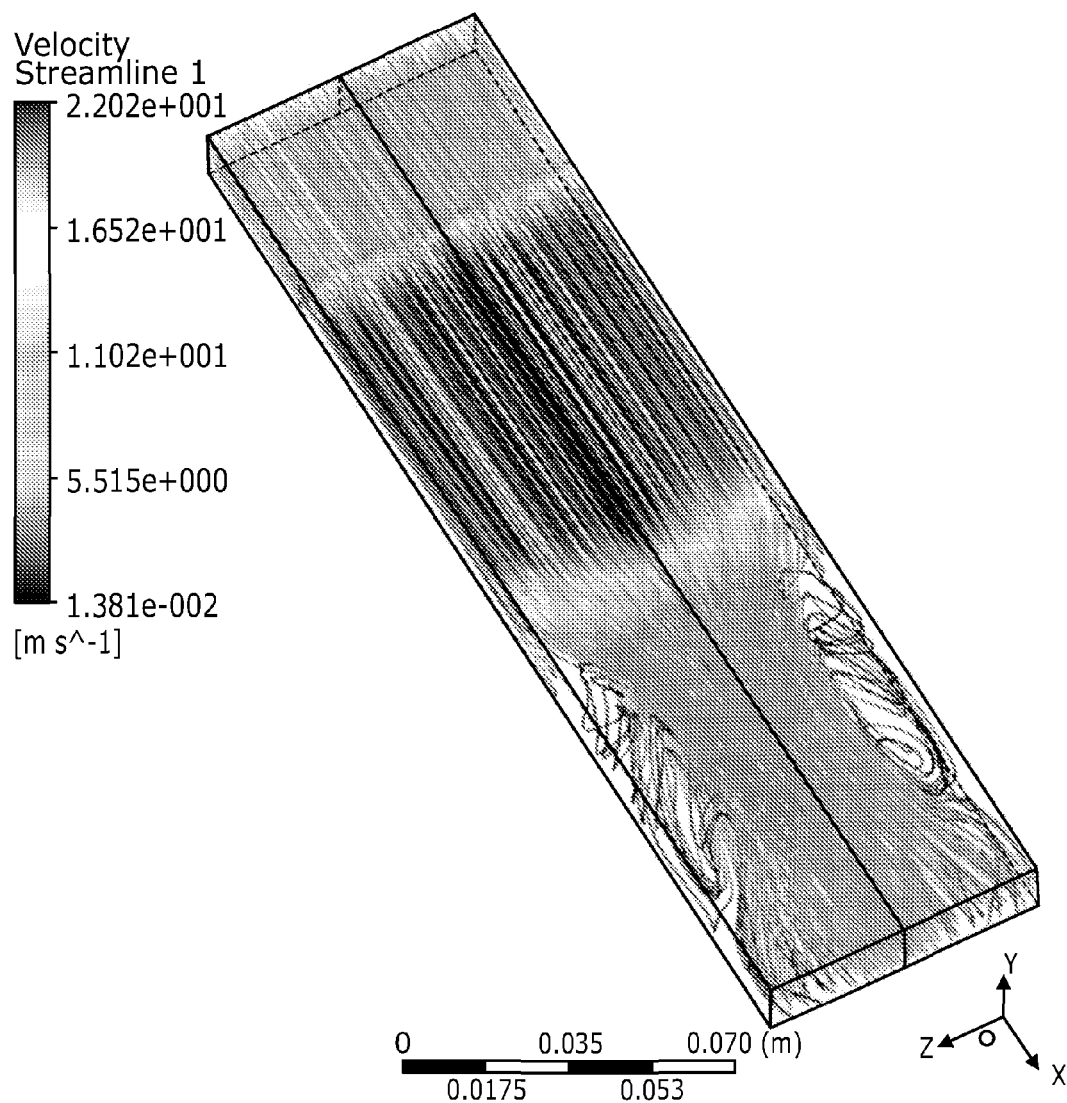
FIGS. 10a-10d show modelled velocity streamline and contours of a vane without fins and with seven fins.
Figure 10B:
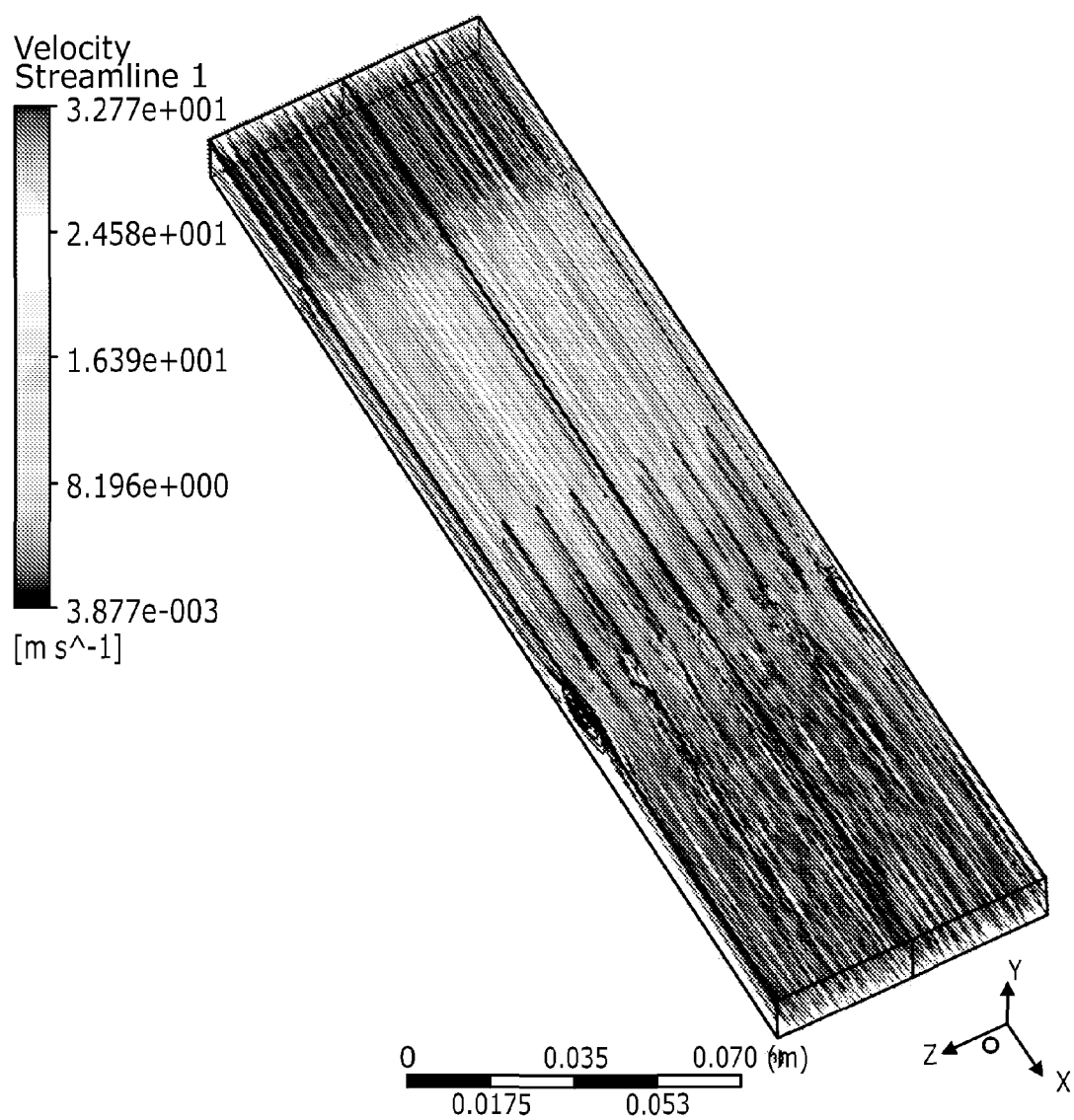

FIGS. 10*a* and 10*b* compare mounting vanes with and without straightening fins. In both cases the leading edge and diffuser section have elliptical cross-sections. FIG. 10*a* shows the results for the mounting vane without fins. FIG. 10*b* shows the results for the mounting vane with the seven fins included. The lines represent velocity streamlines of the cooling gas. As can be seen in FIG. 10*a* there is significant recirculation after the diffuser section. The recirculation is shown by the loops in the velocity streamlines towards the outside of the vane. Recirculation is almost completely eliminated by adding the fins as shown in FIG. 10*b*.

Figure 10C:
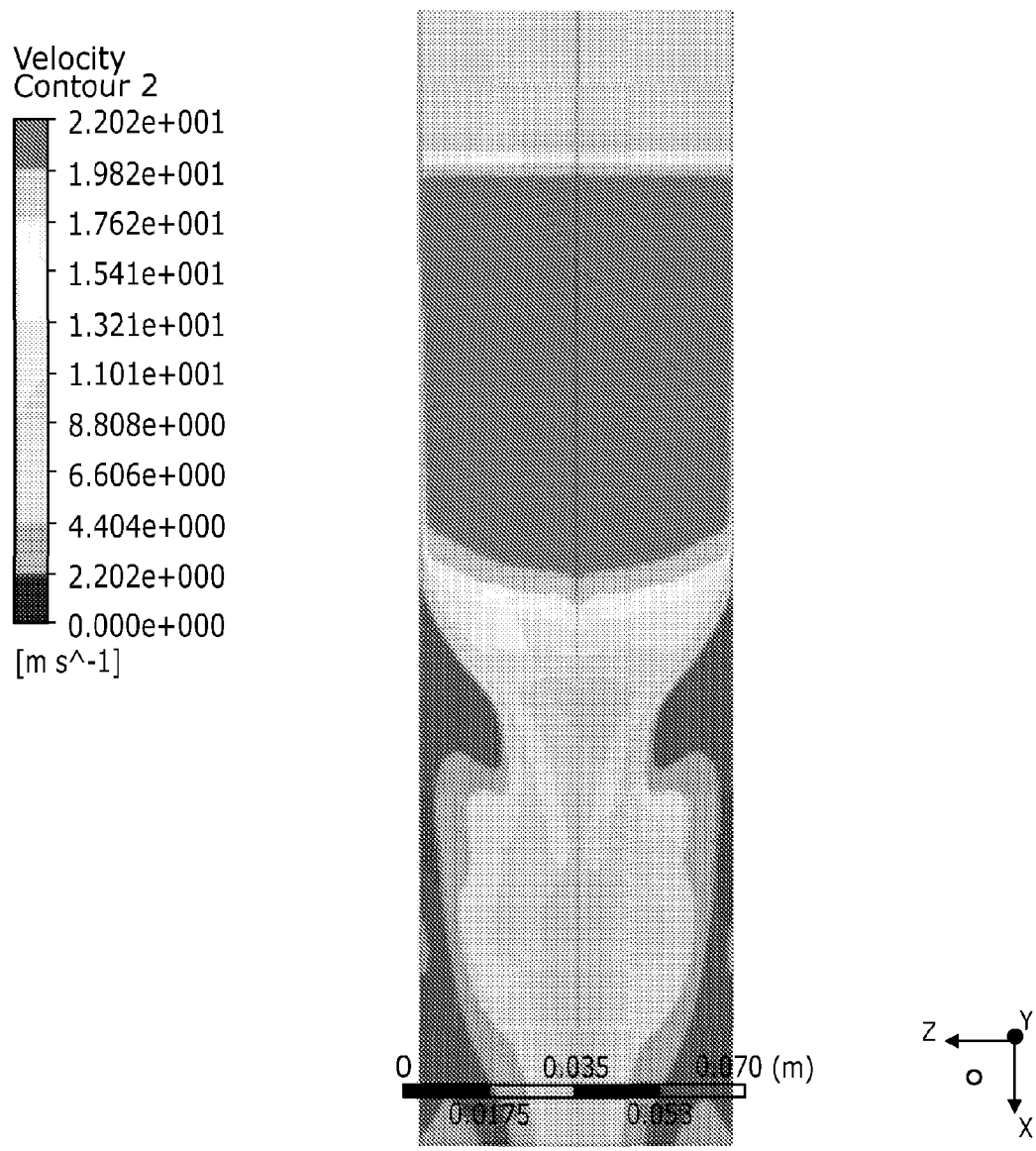
Figure 10D:
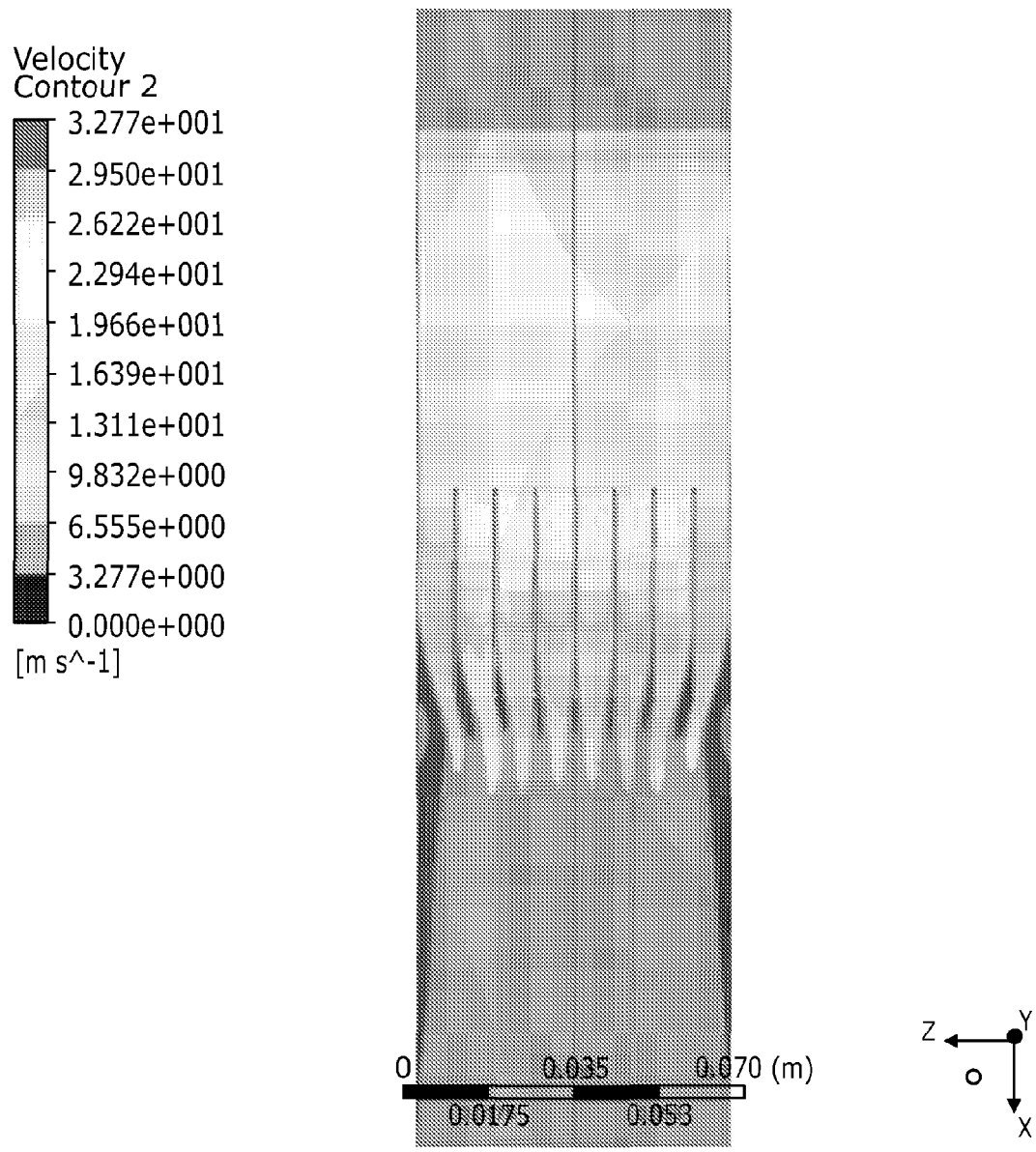

FIGS. 10*c* and 10*d* show velocity contours for the vane without fins (FIG. 10*c*) and with straightening fins (FIG. 10*d*). In FIG. 10*d* the velocity contours are largely uniform across the width of the vane. The acceleration of the gas can be seen at the leading edge and the deceleration over the diffuser section. FIG. 10*c* shows significant narrowing of the fast stream after the diffuser section. These slowed areas correspond to the areas of recirculation in FIG. 10*a*. The width across the vane for which fast flow occurs is reduced in FIG. 10*c*. There is a slight reduction in the width of the fast stream in FIG. 10*d* but the reduction is insignificant compared to FIG. 10*c*. Thus, the flow straightening fins achieve the desired effect and flow recirculation which causes flow instabilities and may cause vibration is reduced.

Figure 11A:
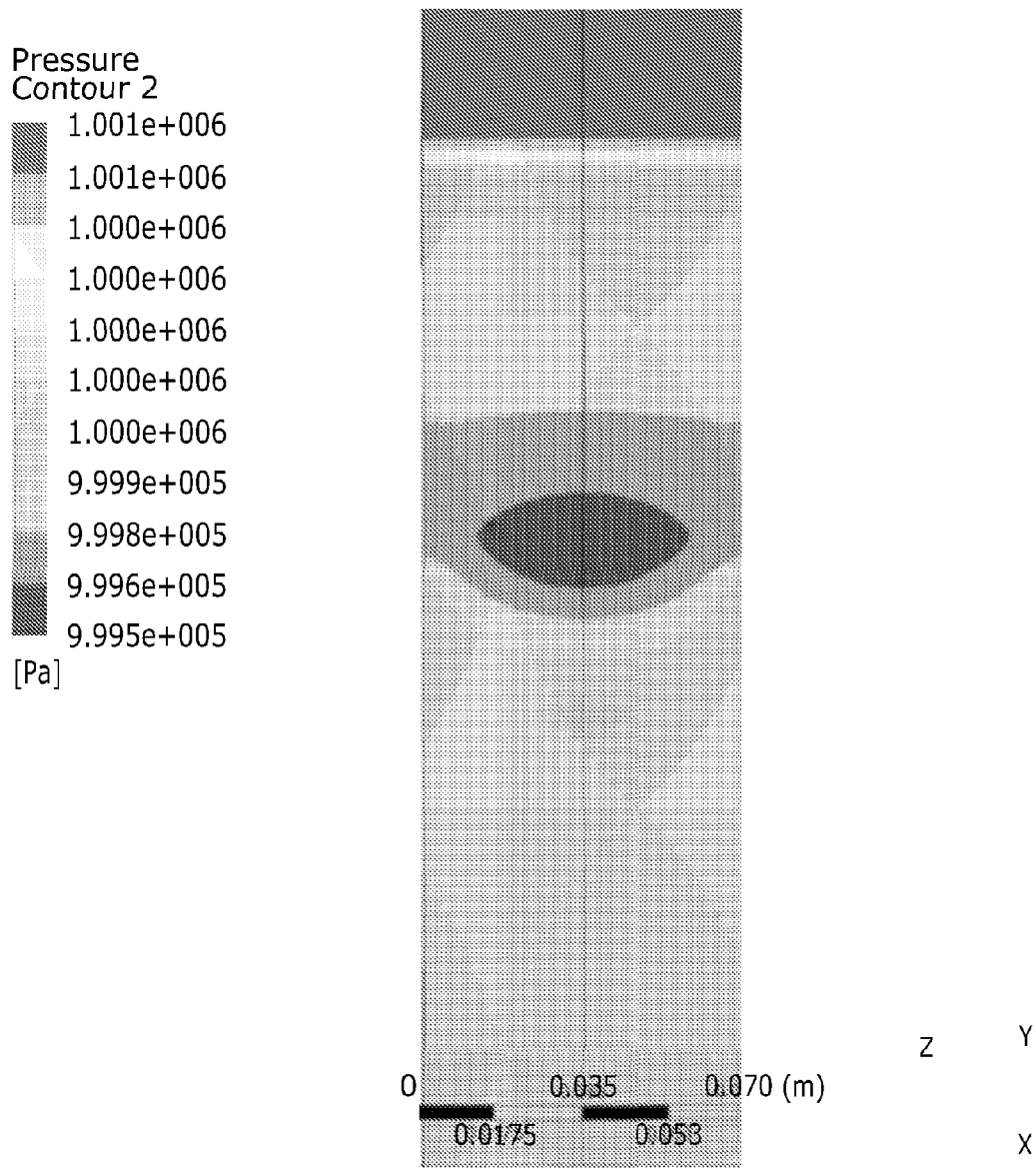
FIGS. 11a and 11b shows modelled pressure contours of a vane without fins and with seven fins.
Figure 11B:
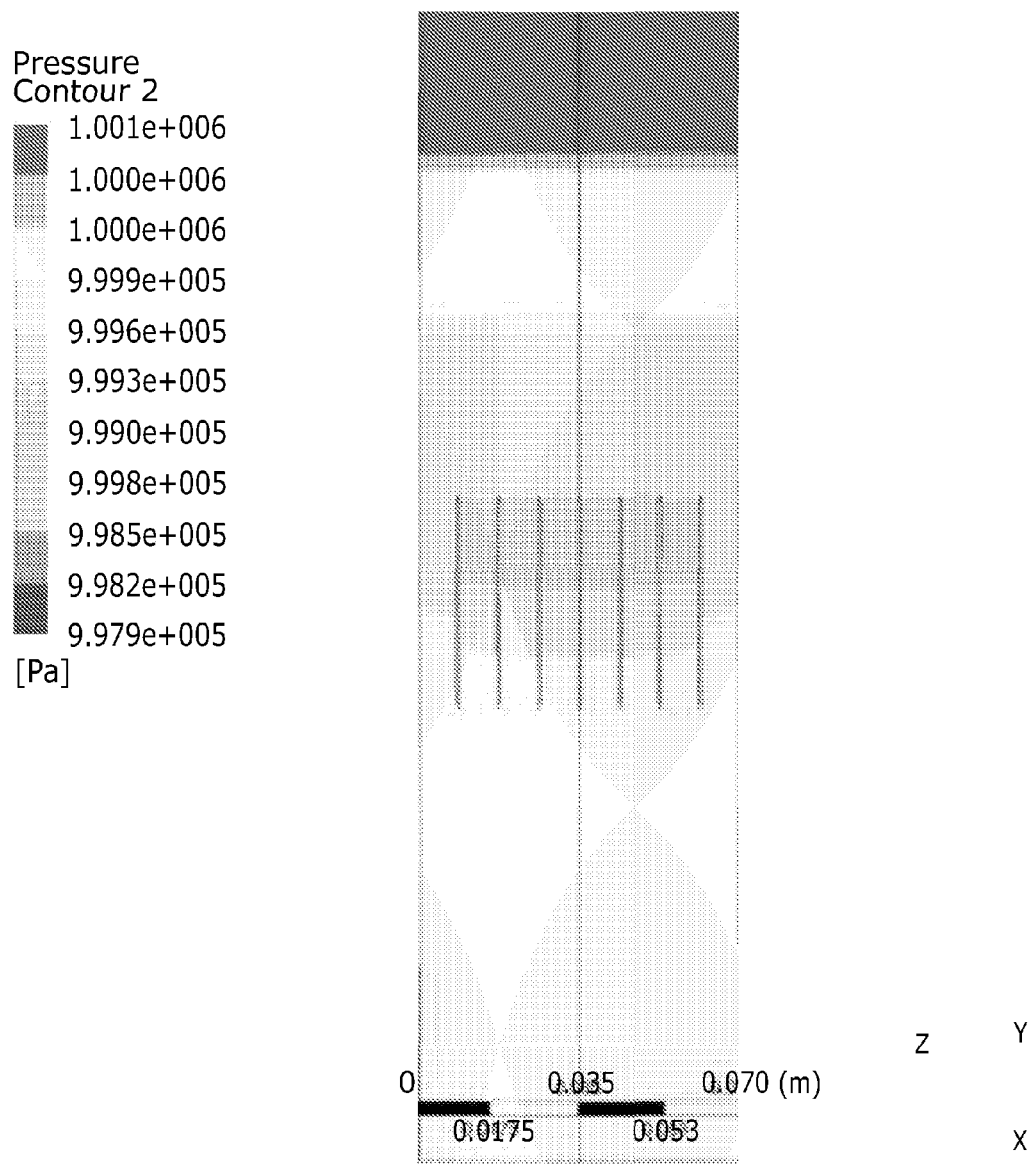

FIGS. 11*a* and 11*b* compare simulated pressure drop for the vane described above. FIG. 11*a* shows the results for the mounting vane without fins. FIG. 11*b* shows the results for the mounting vane with the seven fins included. The centreline pressure contours indicate there is a slight increase in pressure drop for the vane with fins. Some pressure drop is to be expected due to the introduction of obstacles in the flow. However, as shown in FIGS. 11*a* and 11*b* the increase in pressure drop as a result of adding fins is slight and the impact on performance is minimal. Hence, the addition of fins prevents instabilities occurring and therefore minimises the risk of vibration.

The person skilled in the art will readily appreciate that various modifications and alterations may be made to the above described mounting vane without departing from the scope of the appended claims. For example, different shapes, dimensions and materials may be used. The optical element may be an optical gain medium or other heat generating optical element.

The invention claimed is:

1. A mounting vane for an optical element of a laser or optical amplifier, the mounting vane for cooling by a fluid stream, the mounting vane comprising:

an input section with a leading edge for meeting the fluid stream;

a diffuser section which tapers to a trailing edge; and a plane section with an aperture for receiving the optical element for cooling by the fluid stream, the plane section arranged between the input section and diffuser section, wherein the diffuser section includes one or more flow guiding fins protruding from the diffuser section.

2. The mounting vane of claim 1, wherein the flow guiding fins are flow straightening fins.

3. The mounting vane of claim 1, wherein the fins have a length equal to the length of the diffuser section.

4. The mounting vane of claim 1, wherein the fins are parallel.

5. The mounting vane of claim 1, wherein a plurality of fins are distributed across the vane in a direction transverse to the fluid stream.

6. The mounting vane of claim 5, wherein the plurality of fins are evenly distributed across the vane.

7. The mounting vane of claim 1, wherein the optical element is a heat generating element.

8. The mounting vane of claim 1, wherein the optical element is optical gain medium.

9. The mounting vane of claim 8, wherein the optical gain medium comprises Yb:YAG, Nd:YAG or other solid-state laser medium suitable for optical pumping.

10. The mounting vane of claim 1, wherein the aperture for receiving the optical element is rectangular and a diagonal of the rectangle is arranged parallel to the direction of flow of the fluid stream.

11. The mounting vane of claim 1, wherein the aperture for receiving the optical element is circular.

12. The mounting vane of claim 1, wherein the leading edge has a curved cross-section such that when the vane is mounted in the stream the stream flow is accelerated.

13. The mounting vane of claim 12, wherein the curve is elliptical.

14. The mounting vane of claim 1, wherein the taper of the diffuser section includes surfaces which elliptically curve to zero thickness.

15. The mounting vane of claim 1, wherein the mounting vane is for cooling by a gas stream.

16. An optical assembly comprising:

a plurality of the mounting vanes according to claim 1;

a manifold having an input and an output for the fluid stream to flow through and a pair of windows for transmitting an incident light beam to the optical elements, wherein the mounting vanes are stacked in the manifold and the optical element of each mounting vane aligns with the windows of the manifold.

17. The optical assembly of claim 16, wherein the mounting vanes are stacked such that the one or more fins of a first mounting vane are aligned with the one or more fins of a second mounting vane so that the fins divide the fluid stream transversely to the plane of the mounting vane and form a plurality of channels for the fluid stream to flow through.

18. The optical assembly of claim 17, wherein the channels are substantially rectangular and formed by the mounting vanes and aligned fins.

19. The optical assembly of claim 16, further comprising an input flow conditioner internally shaped to convert a fluid stream of circular cross-section to a fluid stream of rectangular cross-section.

20. The optical assembly of claim 16, further comprising an output flow conditioner internally shaped to convert a fluid stream of rectangular cross-section to a fluid stream of circular cross-section.

21. The optical assembly of claim 16, wherein the mounting vanes are spaced in the stack such that the fluid stream flows turbulently through the space between the mounting vanes.

22. A laser comprising the mounting vane of claim 1 and wherein the optical element is optical gain medium.

23. An optical amplifier comprising the mounting vane of claim 1 and wherein the optical element is optical gain medium.

24. The laser of claim 22 arranged such that a pump beam is incident on the optical gain medium.

25. The laser of claim 24, wherein the pump beam and/or output beam propagates through the cooling fluid stream.

26. An optical assembly comprising one or more mounting vanes and a manifold, each mounting vane for mounting an optical element of a laser or optical amplifier for cooling by a fluid stream, each mounting vane comprising: an input section with a leading edge for meeting the fluid stream; a diffuser section which tapers to a trailing edge; and a plane section with an aperture for receiving the optical element for cooling by the fluid stream, the plane section arranged between the input section and diffuser section, and the manifold having an input and an output for the fluid stream to flow through and a pair of windows for transmitting an incident light beam to the optical element, the one or more mounting vanes for mounting in the manifold such that the optical element of each mounting vane aligns with the windows of the manifold, wherein the manifold comprises one or more flow guiding fins protruding towards the diffuser section of the mounting vane.

27. The optical assembly of claim 26, wherein the one or more fins extend across a flow aperture in the manifold between the input and output, the one or more fins having grooves to receive the diffuser section of mounting vanes and the fins meeting the diffuser section normal to the diffuser surface.

28. The optical assembly of claim 26, wherein the fins are arranged to divide the fluid stream transversely to the plane of the mounting vane and form a plurality of channels for the fluid stream to flow through.

29. A mounting vane for an optical element of a laser or optical amplifier, the mounting vane for cooling by a fluid stream, the mounting vane comprising:

an input section with a leading edge for meeting the fluid stream;

a diffuser section which tapers to a trailing edge; and a plane section with an aperture for receiving the optical element for cooling by the fluid stream, the plane section arranged between the input section and diffuser section, wherein the input section has an elliptically curved cross-section such that when the vane is mounted in the stream the stream flow is accelerated.

30. A mounting vane for an optical element of a laser or optical amplifier, the mounting vane for cooling by a fluid stream, the mounting vane comprising:

an input section with a leading edge for meeting the fluid stream;

a diffuser section which tapers to a trailing edge; and a plane section with an aperture for receiving the optical element for cooling by the fluid stream, the plane section arranged between the input section and diffuser section, wherein the diffuser section has an elliptically curved cross-section such that when the vane is mounted in the stream the stream flow is decelerated.

31. The optical amplifier of claim 23 arranged such that a pump beam is incident on the optical gain medium.

32. The optical amplifier of claim 31 wherein the pump beam and/or output beam propagates through the cooling fluid stream.

* * * * *